(12) United States Patent
McKie et al.

(10) Patent No.: US 9,395,097 B2
(45) Date of Patent: Jul. 19, 2016

(54) LAYOUT FOR AN ENERGY RECOVERY VENTILATOR SYSTEM

(75) Inventors: Justin McKie, Frisco, TX (US); Eric Perez, Hickory Creek, TX (US); Bryan Smith, Little Elm, TX (US); Steve Schneider, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 1036 days.

(21) Appl. No.: 13/274,629

(22) Filed: Oct. 17, 2011

(65) Prior Publication Data

US 2013/0092345 A1 Apr. 18, 2013

(51) Int. Cl.
*F24F 12/00* (2006.01)

(52) U.S. Cl.
CPC ......... *F24F 12/001* (2013.01); *F24F 2203/104* (2013.01); *Y02B 30/563* (2013.01); *Y10T 29/4935* (2015.01)

(58) Field of Classification Search
CPC ..... F24F 12/001; F24F 12/006; F24F 12/007; F24F 2011/0002; F24F 2011/0056; F24F 2011/008; F24F 2012/007; F24F 2012/008; F23L 15/02
USPC ...................................................... 165/6–10
See application file for complete search history.

(56) References Cited

U.S. PATENT DOCUMENTS

| | | |
|---|---|---|
| 1,094,309 A | 4/1914 | Daw |
| 3,252,508 A | 5/1966 | Goettl |
| 3,889,742 A | 6/1975 | Rush et al. |
| 4,018,266 A | 4/1977 | Kay |
| 4,060,913 A | 12/1977 | Yoshida et al. |
| 4,228,849 A | 10/1980 | Heinola |
| 4,342,359 A | 8/1982 | Baker |
| 4,497,361 A | 2/1985 | Hajicek |
| 4,611,653 A * | 9/1986 | Ikemura et al. ................ 165/54 |
| 4,727,931 A | 3/1988 | Berner |
| 4,754,651 A | 7/1988 | Shortridge et al. |
| 4,784,212 A | 11/1988 | Brimer et al. |

(Continued)

FOREIGN PATENT DOCUMENTS

JP H0634175 A * 8/1994

OTHER PUBLICATIONS

Lennox Engineering Data, Indoor Air Quality ERV Energy Recovery Ventilator 60 HZ, Bulletin No. 210245, Mar. 2010, 20 pages.

(Continued)

*Primary Examiner* — Frantz Jules
*Assistant Examiner* — Erik Mendoza-Wilkenfe
(74) *Attorney, Agent, or Firm* — Bell Nunnally & Martin LLP; Craig J. Cox

(57) ABSTRACT

An energy recovery ventilator unit. The unit comprises a cabinet housing a primary intake zone, a supply zone, a return zone, an exhaust zone and an enthalpy-exchange zone. The primary intake zone and the exhaust zone are both on one side of the enthalpy exchange zone. The supply zone and the return zone are both on an opposite side of the enthalpy exchange zone. The unit also comprises first and second blowers. The first blower is located in the primary intake zone and configured to push outside air into the primary intake zone and straight through the enthalpy exchange zone into the supply zone. The second blower is located in the return zone and configured to push return air into the return zone and straight through the enthalpy exchange zone into the exhaust zone.

11 Claims, 4 Drawing Sheets

(56) References Cited

U.S. PATENT DOCUMENTS

| | | | |
|---|---|---|---|
| 4,825,936 A | 5/1989 | Hoagland et al. | |
| 4,834,004 A | 5/1989 | Butuk et al. | |
| 4,841,733 A | 6/1989 | Dussault et al. | |
| 4,843,838 A | 7/1989 | Trask | |
| 4,854,726 A | 8/1989 | Lesley et al. | |
| 4,873,649 A | 10/1989 | Grald et al. | |
| 5,062,280 A | 11/1991 | Martin | |
| 5,069,272 A | 12/1991 | Chagnot | |
| 5,173,922 A | 12/1992 | Arakawa et al. | |
| 5,183,098 A * | 2/1993 | Chagnot | 165/54 |
| 5,238,052 A | 8/1993 | Chagnot | |
| 5,316,073 A | 5/1994 | Klaus et al. | |
| 5,372,182 A | 12/1994 | Gore | |
| 5,376,045 A | 12/1994 | Kiser | |
| 5,423,187 A | 6/1995 | Fournier | |
| 5,482,108 A | 1/1996 | Essle et al. | |
| 5,497,823 A | 3/1996 | Davis | |
| 5,515,909 A | 5/1996 | Tanaka | |
| 5,564,626 A | 10/1996 | Kettler et al. | |
| 5,726,424 A | 3/1998 | Koether | |
| 5,728,289 A | 3/1998 | Kirchnavy et al. | |
| 5,761,908 A | 6/1998 | Oas et al. | |
| 5,826,641 A * | 10/1998 | Bierwirth et al. | 165/8 |
| 5,839,096 A | 11/1998 | Lyons et al. | |
| 5,927,096 A | 7/1999 | Piccione | |
| 5,988,157 A * | 11/1999 | Brown et al. | 126/110 R |
| 6,009,763 A | 1/2000 | Berckmans et al. | |
| 6,039,109 A * | 3/2000 | Chagnot et al. | 165/8 |
| 6,176,305 B1 * | 1/2001 | Haglid | F24F 5/0035 165/231 |
| 6,209,622 B1 * | 4/2001 | Lagace et al. | 165/8 |
| 6,223,544 B1 | 5/2001 | Seem | |
| 6,289,974 B1 | 9/2001 | DeGregoria et al. | |
| 6,328,095 B1 | 12/2001 | Felber et al. | |
| 6,355,091 B1 | 3/2002 | Felber et al. | |
| 6,415,616 B1 | 7/2002 | Kim | |
| 6,575,228 B1 | 6/2003 | Ragland et al. | |
| 6,672,627 B1 | 1/2004 | Mariman et al. | |
| 6,776,708 B1 | 8/2004 | Daoutis et al. | |
| 6,925,999 B2 | 8/2005 | Hugghins et al. | |
| 6,929,057 B1 | 8/2005 | Sahota et al. | |
| 7,012,516 B2 | 3/2006 | Laurosch et al. | |
| 7,073,566 B2 | 7/2006 | Lagace et al. | |
| 7,090,000 B2 | 8/2006 | Taylor | |
| 7,100,634 B2 | 9/2006 | Robb et al. | |
| 7,231,967 B2 | 6/2007 | Haglid | |
| 7,308,384 B2 | 12/2007 | Shah et al. | |
| 7,440,864 B2 | 10/2008 | Otto | |
| 7,458,228 B2 | 12/2008 | Lagace et al. | |
| 7,716,936 B2 | 5/2010 | Bailey et al. | |
| 7,841,381 B2 | 11/2010 | Chagnot et al. | |
| 7,856,289 B2 | 12/2010 | Schanin et al. | |
| 7,886,986 B2 | 2/2011 | Fischer, Jr. et al. | |
| 8,123,518 B2 | 2/2012 | Nordberg et al. | |
| 2002/0139514 A1 | 10/2002 | Lagace et al. | |
| 2002/0153133 A1 | 10/2002 | Haglid | |
| 2003/0070787 A1 * | 4/2003 | Moffitt | 165/4 |
| 2003/0085814 A1 | 5/2003 | Griep | |
| 2003/0140638 A1 | 7/2003 | Arshansky et al. | |
| 2003/0178411 A1 | 9/2003 | Manganiello et al. | |
| 2004/0155466 A1 | 8/2004 | Sodemann et al. | |
| 2005/0236150 A1 | 10/2005 | Chagnot et al. | |
| 2005/0252229 A1 | 11/2005 | Moratalla | |
| 2006/0035580 A1 | 2/2006 | Anderson et al. | |
| 2006/0054302 A1 * | 3/2006 | Cho et al. | 165/8 |
| 2006/0219381 A1 | 10/2006 | Lagace et al. | |
| 2007/0045439 A1 | 3/2007 | Wolfson | |
| 2007/0045601 A1 | 3/2007 | Rhee | |
| 2007/0144187 A1 | 6/2007 | Lee | |
| 2007/0171647 A1 | 7/2007 | Artwohl et al. | |
| 2007/0205297 A1 | 9/2007 | Finkam et al. | |
| 2008/0033599 A1 | 2/2008 | Aminpour et al. | |
| 2008/0076346 A1 | 3/2008 | Ahmed | |
| 2008/0108295 A1 * | 5/2008 | Fischer | F24F 3/1423 454/239 |
| 2008/0144238 A1 | 6/2008 | Cline et al. | |
| 2008/0208531 A1 | 8/2008 | Felcman et al. | |
| 2008/0230206 A1 * | 9/2008 | Lestage | F24F 3/147 165/48.1 |
| 2008/0282494 A1 | 11/2008 | Won et al. | |
| 2009/0032604 A1 | 2/2009 | Miller | |
| 2009/0090117 A1 | 4/2009 | McSweeney | |
| 2009/0095096 A1 | 4/2009 | Dean et al. | |
| 2009/0120111 A1 | 5/2009 | Taras et al. | |
| 2009/0156966 A1 | 6/2009 | Kontschieder et al. | |
| 2009/0165644 A1 | 7/2009 | Campbell | |
| 2009/0215375 A1 | 8/2009 | Hagensen | |
| 2009/0222139 A1 | 9/2009 | Federspiel | |
| 2010/0262298 A1 | 10/2010 | Johnson et al. | |
| 2013/0087302 A1 | 4/2013 | McKie et al. | |
| 2013/0090051 A1 | 4/2013 | McKie et al. | |
| 2013/0090769 A1 | 4/2013 | McKie et al. | |
| 2013/0092344 A1 | 4/2013 | McKie et al. | |
| 2013/0092345 A1 | 4/2013 | McKie et al. | |
| 2013/0092346 A1 * | 4/2013 | McKie | F24F 12/001 165/8 |
| 2013/0095744 A1 | 4/2013 | McKie et al. | |
| 2013/0118188 A1 | 5/2013 | McKie et al. | |
| 2013/0158719 A1 | 6/2013 | McKie et al. | |

OTHER PUBLICATIONS

ANSI/AHRI Standard 1060, 2005 Standard for Performance Rating of Air-to-Air Exchangers for Energy Recovery Ventilation, 13 pages.

* cited by examiner

US 9,395,097 B2

LAYOUT FOR AN ENERGY RECOVERY VENTILATOR SYSTEM

CROSS-REFERENCE TO RELATED APPLICATIONS

The present application is related to U.S. patent application Ser. No. 13/274,530, by McKie et al., entitled, "AN ENERGY RECOVERY VENTILATOR UNIT WITH OFFSET AND OVERLAPING ENTHALPY WHEELS" ("Appl-1"); U.S. patent application Ser. No. 13/274,562 by McKie et al., entitled, "A TRANSITION MODULE FOR AN ENERGY RECOVERY VENTILATOR UNIT" ("Appl-2"); and U.S. patent application Ser. No. 13/274,587, by McKie et al., entitled, "SENSOR MOUNTING PANEL FOR AN ENERGY RECOVERY VENTILATOR UNIT" ("Appl-3"), which are all filed on the same date as the present application, and, which are incorporated herein by reference in their entirety. One or more of the above applications may describe embodiments of Energy Recovery Ventilator Units and components thereof that may be suitable for making and/or use in some of the embodiments described herein.

TECHNICAL FIELD

This application is directed, in general, to space conditioning systems and methods for conditioning the temperature and humidity of an enclosed space using an energy recovery ventilator.

BACKGROUND

Energy recover ventilator units recover energy from exhaust air for the purpose of pre-conditioning outdoor air prior to supplying the conditioned air to a conditioned space, either directly, or, as part of an air-conditioning system. Many energy recover ventilator units available in the market today often employ a pull-push design using two forward-directed blowers. One blower is configured to pull fresh outside air through the unit towards the conditioned space, and the other blower is configured to push stale return air through the unit towards the outside space. Such units can have inherent problems relating to servicing of major system components, preventing moisture build-up, and, the ability to provide free cooling when ambient conditions are appropriate.

SUMMARY

One embodiment of the present disclosure is an energy recovery ventilator unit. The unit comprises a cabinet housing a primary intake zone, a supply zone, a return zone, an exhaust zone and an enthalpy-exchange zone. The primary intake zone and the exhaust zone are both on one side of the enthalpy exchange zone. The supply zone and the return zone are both on an opposite side of the enthalpy exchange zone. The unit also comprises first and second blowers. The first blower is located in the primary intake zone and configured to push outside air into the primary intake zone and straight through the enthalpy exchange zone into the supply zone. The second blower is located in the return zone and configured to push return air into the return zone and straight through the enthalpy exchange zone into the exhaust zone.

Another embodiment of the present disclosure is a method of manufacturing an energy recovery ventilator unit. The method comprises providing a cabinet having exterior walls and interior floors and walls that define an intake zone, a supply zone, a return zone, an exhaust zone and an enthalpy-exchange zone as described above. The method also comprises installing a first blower in the primary intake zone, the first blower configured to push outside air into the intake zone and straight through the enthalpy exchange zone into the supply zone. The method further comprises installing a second blower in the return zone, the second blower configured to push return air into the return zone and straight through the enthalpy exchange zone into the exhaust zone.

BRIEF DESCRIPTION OF THE DRAWINGS

Reference is now made to the following descriptions taken in conjunction with the accompanying drawings, in which.

DETAILED DESCRIPTION

The term, "or," as used herein, refers to a non-exclusive or, unless otherwise indicated. Also, the various embodiments described herein are not necessarily mutually exclusive, as some embodiments can be combined with one or more other embodiments to form new embodiments.

Figure 1:
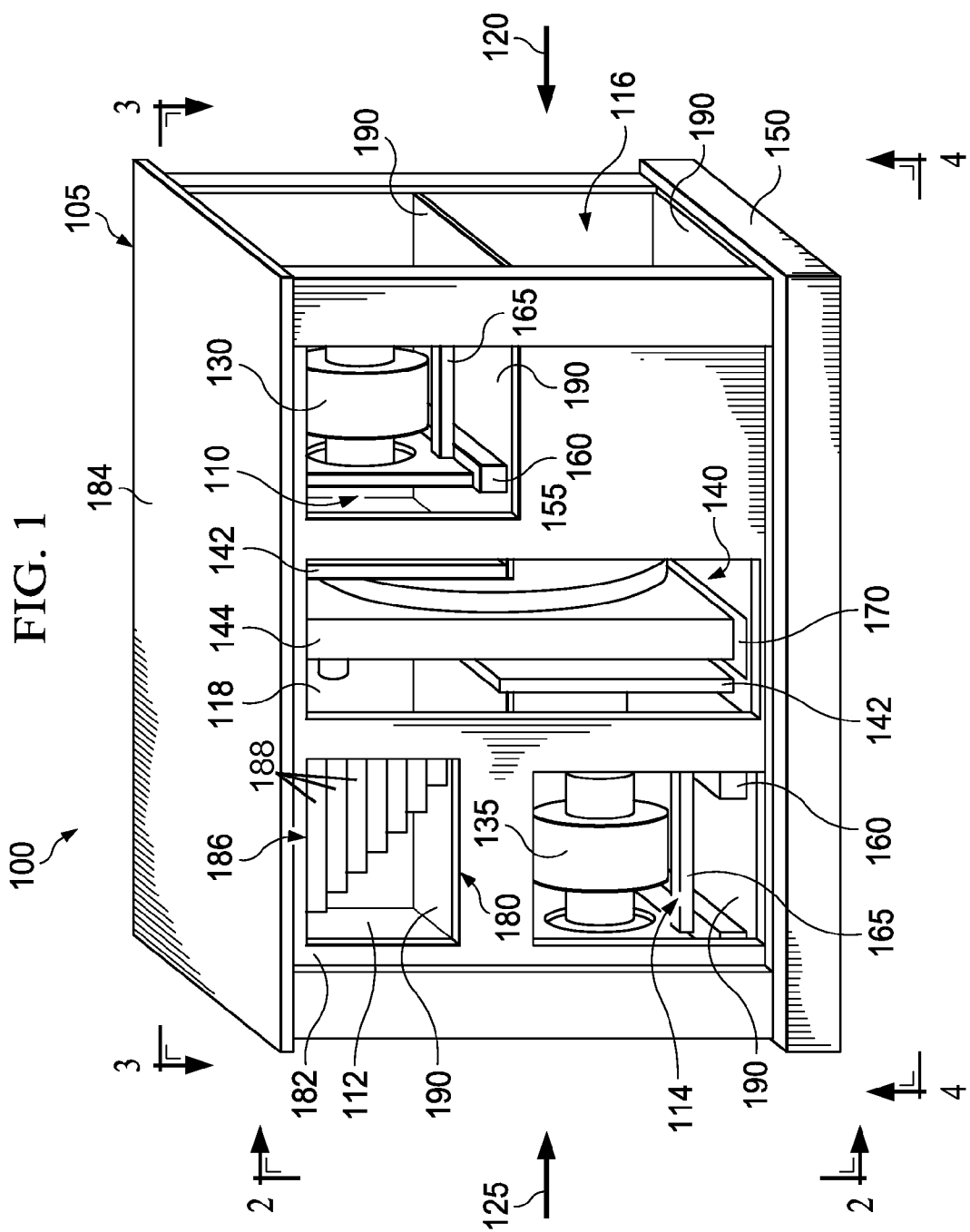
FIG. 1 presents a three-dimensional view of an example energy recovery ventilator unit of the disclosure.
Figure 2:
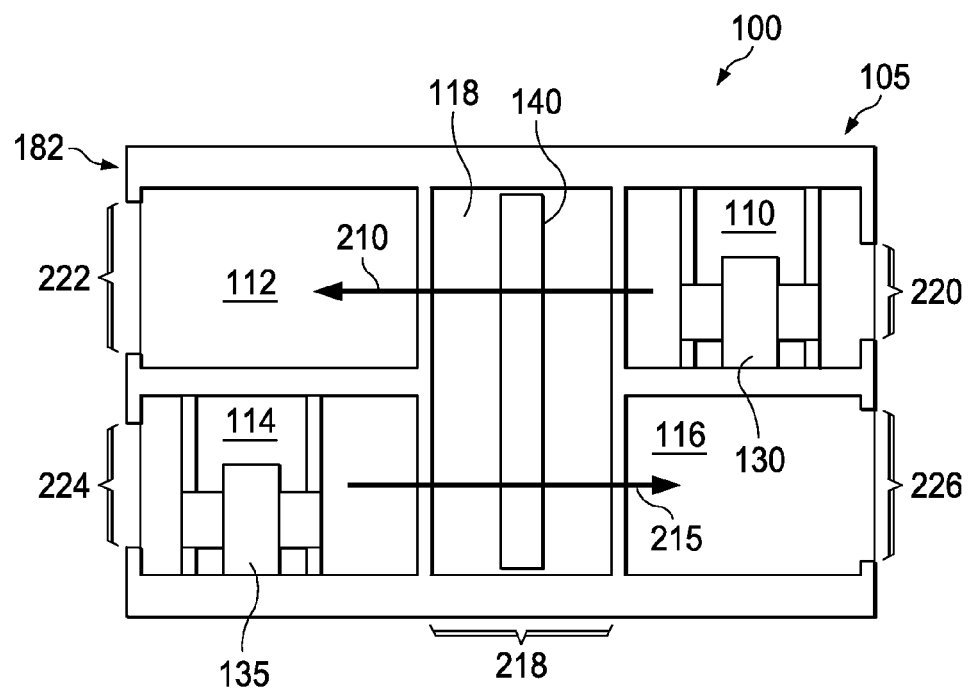
FIG. 2 presents a side view of the example energy recovery ventilator unit presented in FIG. 1 along view line 2 as shown FIG. 1.
Figure 3:
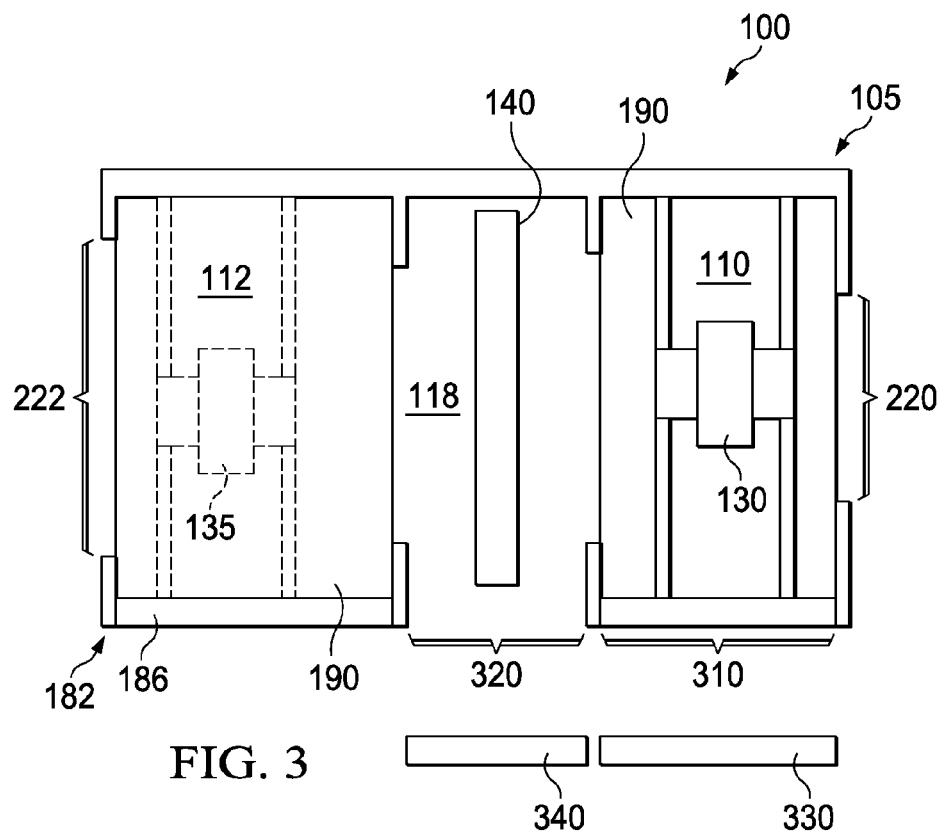
FIG. 3 presents a top plan view of the example energy recovery ventilator unit presented in FIG. 1 along view line 3 as shown FIG. 1.

One embodiment of the present disclosure is an energy recovery ventilator unit. FIG. 1 presents a three-dimensional view of an example energy recovery ventilator unit 100 of the disclosure. FIG. 2 presents a side view of the example energy recovery ventilator unit 100 presented in FIG. 1 along view line 2 as shown FIG. 1. FIG. 3 presents a top-down plan view of the example energy recovery ventilator unit 100 presented in FIG. 1 along view line 3 as shown FIG. 1. FIG. 3 presents a bottom-up plan view of the example energy recovery ventilator unit 100 presented in FIG. 1 along view line 4 as shown FIG. 1. Some exterior portions of a cabinet 105 are not shown in these figures so that the features within can be more clearly depicted.

As illustrated in FIG. 1, the energy recovery ventilator unit 100 comprises a cabinet 105 housing a primary intake zone 110, a supply zone 112, a return zone 114, an exhaust zone 116 and an enthalpy-exchange zone 118. The primary intake zone 110 and the exhaust zone 116 are both on one side 120 of the enthalpy exchange zone 118, and, the supply zone 112 and the return zone 114 are both on an opposite side 125 of the enthalpy exchange zone 118. The energy recovery ventilator unit 100 also comprises a first blower 130 and a second blower 135. The first blower 130 is located in the primary intake zone 110 and is configured to push outside air into the primary intake zone 110 and straight through the enthalpy exchange zone 118 into the supply zone 112. The second blower 135 is located in the return zone 114 and is configured to push return air into the return zone 114 and straight through the enthalpy exchange zone 118 into the exhaust zone 116.

For example, as illustrated in FIG. 2, the direction 210 of outside air is successively pushed, via the first blower 130, straight through the intake zone 110 and the enthalpy exchange zone 118 to the supply zone 112. The air from the supply zone 112 can subsequently travel towards a conditioned space, either directly, or indirectly, after traveling through other components (e.g., a roof top unit) of a space-conditioning system. In an opposite direction 215, return air is pushed by the second blower 135 successively through the return zone 114 and the enthalpy exchange zone 118 and the exhaust zone 116. The air from the supply zone can travel out of the cabinet 102 into the outside air.

The first and second blowers 130, 135, when blowing air, cause the primary intake zone 110, the supply zone 112, the return zone 114, the exhaust zone 116 and the enthalpy-exchange zone 118 to all have a positive pressure as compared to the atmospheric pressure outside of the cabinet 105. Having a positively pressurized cabinet 105 advantageously eliminates water intrusion into the cabinet 105, as compare to other energy recovery ventilator unit designs, where the cabinet is not designed to have a positive pressure.

Having a positively pressurized cabinet 105 also lowers the Outdoor Air Correction Factor (OACF) and Exhaust Air Transfer Ratio (EATR), thereby reducing the need for a purge option for the enthalpy exchange zone (e.g., the enthalpy wheel in the enthalpy exchange zone). The terms OACF and EATR as used herein, are used as defined by the Air-conditioning Heating and Refrigeration Institute Standard 1060, which is incorporated reference herein in its entirety (Arlington, Va.).

As illustrated in FIGS. 1-4, the first and second blowers 130, 135 are positioned diagonally (either vertically or horizontally) with respect to each other in the cabinet 105. For instance, in some embodiments of the unit 100, such as shown in FIGS. 1-2, the primary intake zone 110 and the exhaust zone 116 are vertically stacked, and, the supply zone 112 and the return zone 114 are vertically stacked. In such embodiments, the first and second blowers 130, 135 are vertically diagonally positioned in the cabinet 105. However, in other embodiments all four of the zones 110, 112, 114, 116 can be in a same horizontal plane. In such instances, the zones 110, 112, 114, 116 are not vertically stacked. In some embodiments, for example, FIG. 2 could depict a top-down plan view and FIGS. 3-4 could depict side views of the unit 100, with respect to the blower and zone locations. In such embodiments, the first and second blowers 130, 135 are horizontally diagonally positioned in the cabinet 105.

In some embodiments, such as shown in FIGS. 1-2, the primary intake zone 110 is vertically stacked above the exhaust zone 116, and, the supply zone 112 is vertically stacked above the return zone 114. In such embodiments, the airflow from outside is in a direction 210 through the upper two zones 110, 112 towards the conditioned air space, and, the return airflow (e.g., from the conditioned space) is in an opposite direction 215 through the lower two zones 114, 116 towards the outside environment. In other embodiments, however, the location of the zones 110, 112, 114, 116 can be reversed such the exhaust zone 116 is vertically stacked above the intake zone 110, and, the return zone 114 is vertically stacked above the supply zone 112. In such cases, the outside airflow travels through the two lower zones 110, 112 and the return air travels through the two upper zones 114, 116.

The enthalpy-exchange zone 118 can include any enthalpy-exchanger device 140 configured to facilitate the transfer of sensible and latent heat and moisture in the outside air steam entering through the input zone 110 to/from the return air steam entering through the return zone 114. For instance, in some embodiments, the enthalpy-exchange zone 118 includes an enthalpy-exchanger device 140 configured as one or more enthalpy wheels. However, in other embodiments, the enthalpy-exchanger device 140 could be configured as a one or more plated heat exchangers or heat pipes. One skilled in the art would appreciate that the enthalpy-exchange zone 118 could include additional components to support or enhance the operation of the enthalpy-exchanger device 140. Example of such components include air filters 142 positioned adjacent to the enthalpy-exchanger device 140, a casing 144 to hold the enthalpy-exchanger device 140, or other components such as a drive mechanism to cause wheel rotation, or seals, to retard the leakage of air from one zone to another zone (e.g., from zone 110 to zone 112, or, from zone 114 to zone 116) without first passing through the enthalpy-exchanger device 140.

As illustrated in FIG. 1, in some embodiments, the enthalpy-exchanger device 140, configured as one or more enthalpy wheels, is vertically oriented with respect to a planar base 150 that the unit 100 is located on. That is, a major surface 155 of the wheel 140 can be substantially perpendicular to the base 150. Having such a vertical orientation can facilitate easy cleaning and servicing of the wheel 140, because the wheel 140 can be removed from the cabinet 105 without having to lift it out of the cabinet 105.

In some embodiments, the first and the second blowers 130, 135 are configured as impeller blowers, e.g., with backwards curved blades. The use of impeller blowers can be advantageous because their compact size is conducive to easy removal from the cabinet 105 for servicing or replacement. In other cases however, the other types of blowers, such as centrifugal blowers, can be used so long the blower can be configured to push air into its respective zone (e.g., one of zones 110 or 114) to thereby positively pressurize the cabinet 105.

In some embodiments, the intake zone 110 and the return zone 112 each include separate mounting platforms 160 configured to support a blower (e.g., one of first blower 130 or second blower 135) thereon, and, the mounting platforms 160 (or at least a portion thereof) are configured to slide in and out of the cabinet 105. For instance, the first and second blowers 130, 135, both configured as impeller type blowers, can be placed on mounting platforms 160 and the blowers 130, 135 can be secured in a casing 165 that includes wheels or rollers configured to roll on the mounting platform 160, or is otherwise configured to facilitate sliding the blowers 130, 135 in and out of the cabinet 105.

Similarly, in some embodiments, the enthalpy-exchange zone 118 includes a mounting platform 170 configured to support an enthalpy-exchange device 140 thereon, and the mounting platform 170 is configured to slide in and out of the cabinet 105. For instance, the casing 144 can includes wheels or rollers configured to roll on the mounting platform 170, to facilitate sliding the enthalpy-exchange device 140 in and out of the cabinet 105.

As further illustrated in FIG. 2, embodiments of the cabinet 105 can further include openings 220, 222, 224, 226 associated with each of the zones 110, 112, 114, 116. For instance, there can be an intake opening 220 connected to the intake zone 110 and an exhaust opening 226 connected to the exhaust zone 116, both of the primary intake and exhaust openings 220, 226 being located on one end 120 of the cabinet 105. There can be a supply opening 222 connected to the supply zone 112 and a return opening 224 connected to the returned zone 114, both the supply and return openings 222, 224 being located on an opposite end 125 of the cabinet 105.

As further illustrated in FIG. 1, some embodiments the cabinet 105 further include a secondary intake opening 180 located in a sidewall 182 of the cabinet 105, the secondary opening 180 connected to the supply zone 114. The secondary intake opening 180 is configured to provide a controlled delivery of outside air to the supply zone 114. The layout of the zones 110, 112, 114, 116 in the cabinet 105, such as described above, allows the secondary intake opening 180 to be located in the sidewall 182. This, in turn, can eliminate the need to increase the size of the cabinet, and/or to putting the opening 180 in a top wall 184 of the cabinet 105, e.g., above the enthalpy-exchange zone 118, and thereby increasing the vertical profile of the unit 100.

Under certain outside air conditions, the secondary intake opening 180 allows free-cooling of the conditioned space. That is, by by-passing the intake zone 110, the secondary intake opening 180 can allow cool outdoor air to entering the supply zone 114 without expending energy to push the outdoor air through the enthalpy zone 118 via the blower 130. Moreover, the degree of such so-called "free-cooling" can be adjusted by controlling the delivery of air through the secondary intake opening 180.

To facilitate the controlled delivery of outdoor air through the secondary opening 180, the secondary intake opening180 can be covered with an air controller assembly 186 which is configured to control the volume of the outside air passing through the secondary intake opening 180. In FIG. 1, only a partial cut-away view of the example air controller assembly 186 is depicted so that the supply zone 112 and secondary input opening 180 can be more clearly depicted. In some cases, the air controller assembly 186 can include baffles or dampers 188 which are continuously adjustable to allow substantially no air, to large volumes of air, to pass through the secondary intake opening 180. One of ordinary skill would appreciate that other types of air controller assemblies 186 that could used to control air flow through the secondary intake opening 180.

Figure 4:
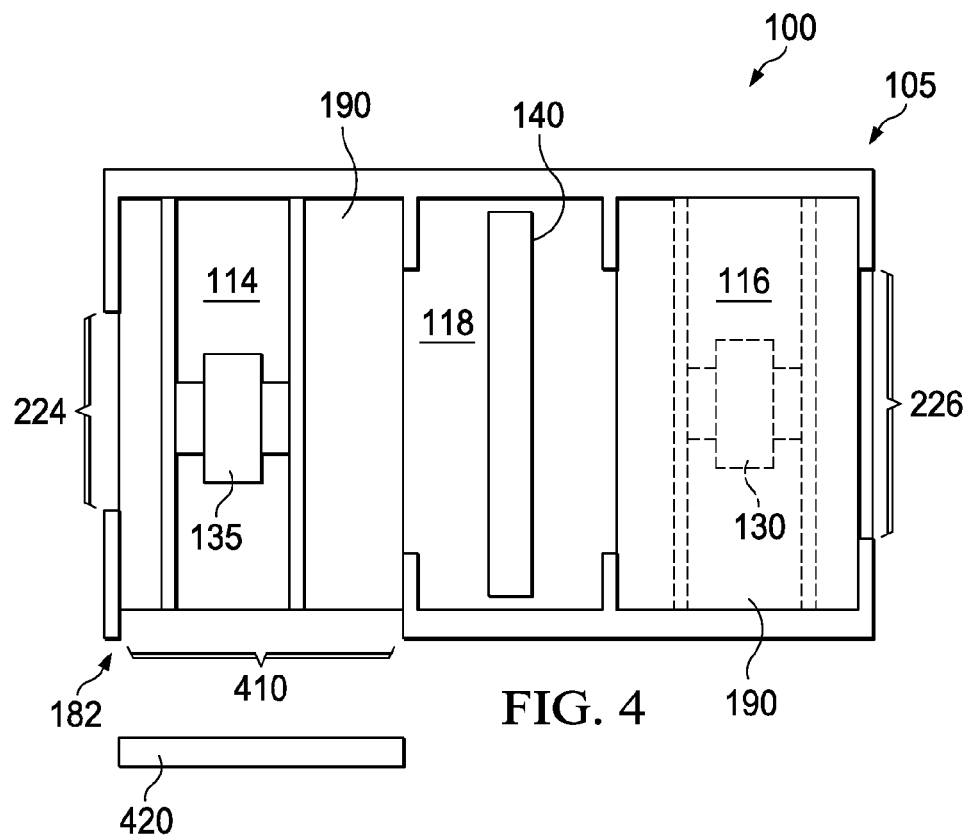
FIG. 4 presents a bottom plan view of the example energy recovery ventilator unit presented in FIG. 1 along view line 4 as shown FIG. 1.

As further illustrated in FIGS. 3-4, embodiments of the cabinet 105 can further include separate access openings 310, 410 for the first and second blowers 130, 135, located in intake zone 110 and the return zone 114, respectively, and, also include an access opening 320 in the enthalpy-exchanger zone 118. In some embodiments, these separate access openings 310, 320, 410 are all located in a same sidewall 182 of the cabinet 105 to advantageously allow to all of these components, 130, 135, 140 in the different zones 110, 114, 118, to be independently serviced from one side of the cabinet 105, without interrupting the unit's 100 operation, in some cases. When the unit 100 is in operation, the access openings 310, 320, 410 are preferably covered with thermally-insulated doors 330, 340, 420 that help form an air-tight and moisture-tight seal to the cabinet 105.

Figure 5:
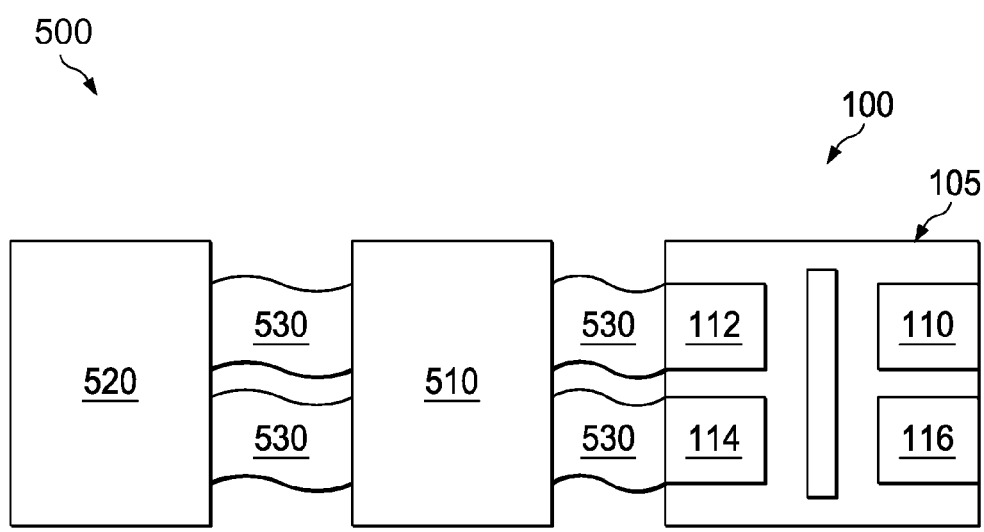
FIG. 5 presents a block diagram of the energy recovery ventilator unit as part of an example space conditioning system.

FIG. 5 presents a block diagram of the energy recovery ventilator unit 100, shown as part of an example space conditioning system 500. The unit 100 could comprise any of the example embodiments discussed in the context of FIGS. 1-4. As illustrated in FIG. 5, the supply zone 112 and the return zone 114 are coupled to an air-handler unit 510, e.g., a roof top unit, and the energy recovery ventilator unit 100 and the air handler unit 510 are both part of the space conditioning system 500. The air handling unit 510 sends conditioned air and receives stale air to and from a conditioned space 520 (e.g., the inside of house or building). One skilled in the art would be familiar with the appropriate connecting structures 530, (e.g., duct-work) to connect the air flows between the energy recovery ventilator unit 100 and air-handler unit 510 and between the air handler unit 510 and the conditioned space 520.

Figure 6:
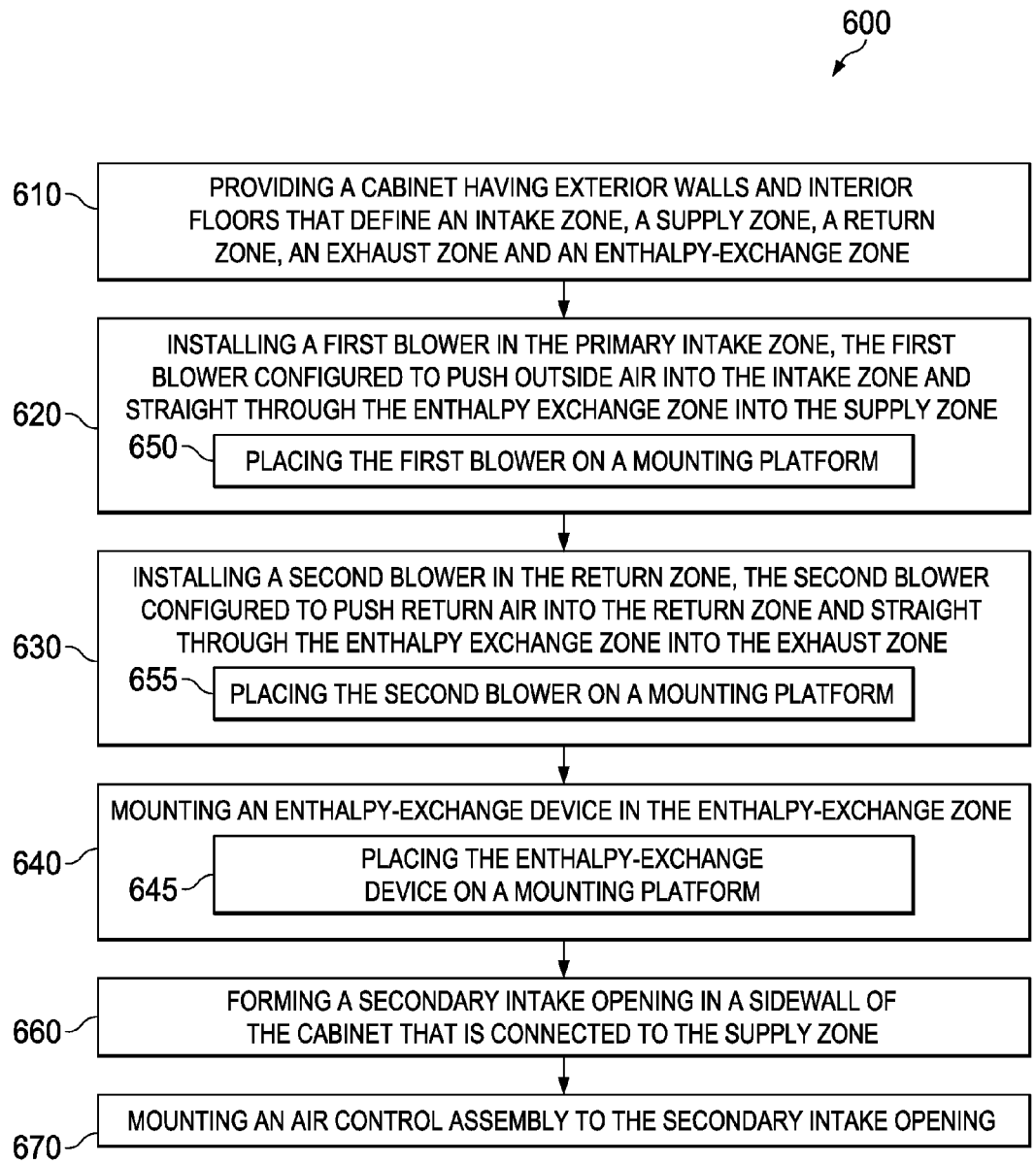
FIG. 6 presents a flow diagram of an example method of manufacturing an energy recovery ventilator unit of the disclosure, including any of the example embodiments discussed in the context of FIGS. 1-4.

Another embodiment of the present disclosure is a method of manufacturing an energy recovery ventilator unit, such as any of the units 100 discussed in the context of FIGS. 1-5. FIG. 6 presents a flow diagram of an example method 600 of manufacture.

With continuing reference to FIGS. 1-5 throughout, the example method 600 comprises a step 610 of providing a cabinet 105 having exterior walls 182, 184 and interior floors 190 that define a primary intake zone 110, a supply zone 112, a return zone 114, an exhaust zone 116 and an enthalpy-exchange zone 118. The primary intake zone 110 and the exhaust zone 116 are both on one side 120 of the enthalpy-exchange zone 118, and the supply zone 112 and the return zone 114 are both on an opposite side 125 of the enthalpy-exchange zone 118.

The method 600 further comprises a step 620 of installing a. first blower 130 in the primary intake zone 110. The first blower 130 is configured to push outside air into the intake zone 110 and straight through the enthalpy exchange zone 118 into the supply zone 112. The method 600 further comprises a step 630 of installing a second blower 135 in the return zone 114. The second blower 135 is configured to push return air into the return zone 114 and straight through the enthalpy exchange zone 118 into the exhaust zone 116.

Embodiments of the method 600 further include a step 640 of mounting an enthalpy-exchange device 140 (e.g., one or more enthalpy wheels) in the enthalpy-exchange zone 118. For instance, the enthalpy wheel 140 or wheels can be mounted in a casing 144 such that the major surface 155 of the wheel 140 is substantially perpendicular the base 150 and the directions of air flow 210, 215 through the unit 100.

In some cases, the step 640 of mounting the enthalpy-exchange device 140 further includes a step 645 of placing the enthalpy-exchange device 140 on a mounting platform 170 configured to support the enthalpy-exchange device 140 thereon and sliding the enthalpy-exchange device 140 the mounting platform 160 into the cabinet 105.

Likewise, the steps 620, 320 of installing the first and second blowers 130, 135 can further include steps 650, 655 of placing the first and second blowers 130, 135 on separate mounting platforms 160 configured to support the respective blowers 130, 135 thereon, and sliding the blowers 130, 135 and the mounting platforms into the cabinet 105.

In some embodiments of the method 600 providing the cabinet 105 (step 610) can further include a step 660 of forming a secondary intake opening 180 in a sidewall 184 of the cabinet 105 that is connected to the supply zone 114. Those of ordinary skill in the art would be familiar with procedures such as laser cutting or mechanical cutting or grinding to form the opening 180 or other openings 310, 410, 420 in the walls 182, 184 of the cabinet 105.

In some embodiments of the method 600, providing the cabinet 105 (step 610) can include a step 670 of mounting an air control assembly 186 to the secondary intake opening 180. The air control assembly 186 can be configured to provide a controlled delivery of outside air to the supply zone 112, e.g., through the adjustment of the dampers 188 of the assembly 186.

Those skilled in the art to which this application relates will appreciate that other and further additions, deletions, substitutions and modifications may be made to the described embodiments.

The invention claimed is:

1. An energy recovery ventilator unit, comprising:
a cabinet housing a primary intake zone, a supply zone, a return zone, an exhaust zone and an enthalpy-exchange zone, wherein:
the primary intake zone and the exhaust zone are both on one side of the enthalpy exchange zone, and
the supply zone and the return zone are both on an opposite side of the enthalpy exchange zone;
a first blower located in the primary intake zone and configured to push outside air into the primary intake zone and straight through the enthalpy exchange zone into the supply zone; and
a second blower located in the return zone and configured to push return air into the return zone and straight through the enthalpy exchange zone into the exhaust zone, and wherein the cabinet includes:
an intake opening connected to the primary intake zone and an exhaust opening connected to the exhaust zone, both of the primary intake and exhaust openings being located in an end wall on one end of the cabinet,
a supply opening connected to the supply zone and a return opening connected to the return zone, both the supply and return openings being located on an opposite end wall of the cabinet,
a secondary intake opening located in a side wall of the cabinet that is different from the end wall and opposite end wall, connected to the supply zone, proximately positioned vertically above the return zone, and downstream of the first blower, the secondary intake opening configured to provide a controlled delivery of atmospheric air to the supply zone;
a first access opening providing access to the primary intake zone;
a second access opening providing access to the return zone; and
a third access opening providing access to the enthalpy-exchange zone;
wherein the first, second, and third openings are located in the side wall of the cabinet where the secondary intake opening is located.

2. The unit of claim 1, wherein the first and second blowers when blowing air cause the primary intake zone, the supply zone, the return zone, the exhaust zone and the enthalpy-exchange zone to all have a positive pressure as compared to the atmospheric pressure outside of the cabinet.

3. The unit of claim 1, wherein the primary intake zone and the exhaust zone are vertically stacked, and, the supply zone and the return zone are vertically stacked.

4. The unit of claim 1, wherein the primary intake zone is vertically stacked above the exhaust zone, and, the supply zone vertically stacked above the return zone.

5. The unit of claim 1, wherein the enthalpy-exchange zone includes an enthalpy-exchanger device configured as one or more enthalpy wheels.

6. The unit of claim 5, wherein the one or more enthalpy wheel is vertically oriented with respect to a base that the unit is located on.

7. The unit of claim 1, wherein the first and the second blowers are configured as impeller blowers.

8. The unit of claim 1, wherein the primary intake zone and the return zone each include separate mounting platforms configured to support a blower subunit thereon, and the mounting platforms are configured to slide in and out of the cabinet.

9. The unit of claim 1, where the enthalpy-exchange zone includes a mounting platform being configured to support an enthalpy-exchange device thereon, and the mounting platform is configured to slide in and out of the cabinet.

10. The unit of claim 1, wherein the secondary intake opening is covered with an air controller assembly, wherein the controller assembly is configured to control the volume of the outside air passing through the secondary intake opening.

11. The unit of claim 1, wherein the supply zone and the return zone are coupled to an air-handler unit, and the energy recovery ventilator unit and the air handler unit are both part of a space conditioning system.

* * * * *